United States Patent
Singh et al.

(10) Patent No.: US 6,545,273 B1
(45) Date of Patent: Apr. 8, 2003

(54) USE OF MULTIPLE TIPS ON AFM TO DECONVOLVE TIP EFFECTS

(75) Inventors: Bhanwar Singh, Morgan Hill, CA (US); Bharath Rangarajan, Santa Clara, CA (US); Sanjay K. Yedur, San Ramon, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 253 days.

(21) Appl. No.: 09/729,292

(22) Filed: Dec. 4, 2000

Related U.S. Application Data

(60) Provisional application No. 60/242,650, filed on Oct. 24, 2000.

(51) Int. Cl.[7] ................................................ G01N 23/00
(52) U.S. Cl. .......................... 250/306; 250/307; 73/105
(58) Field of Search ................................. 250/306, 307; 73/105

(56) References Cited

U.S. PATENT DOCUMENTS

| | | | |
|---|---|---|---|
| 5,235,187 A | * 8/1993 | Arney et al. | 250/306 |
| 5,267,471 A | 12/1993 | Abraham et al. | 73/105 |
| 5,283,442 A | * 2/1994 | Martin et al. | 250/559.22 |
| 5,298,975 A | * 3/1994 | Khoury et al. | 356/624 |
| 5,395,741 A | 3/1995 | Marchman | 430/321 |
| 5,578,745 A | 11/1996 | Bayer et al. | 73/1 J |
| 5,580,827 A | 12/1996 | Akamine | 437/225 |
| 5,703,979 A | 12/1997 | Filas et al. | 785/43 |

* cited by examiner

Primary Examiner—John R. Lee
Assistant Examiner—Nikita Wells
(74) Attorney, Agent, or Firm—Eschweiler & Associates, LLC

(57) ABSTRACT

The present invention comprises a system for deconvolving tip effects associated with scanning tips in scanning probe microscopes and other scanning systems. The system comprises a scanning system operable to scan a feature or artifact with multiple, different type scanning tips and generate scan data associated therewith and a processor operably coupled to the scanning system. The processor is adapted to determine characteristics associated with the multiple, different type scanning tips using the scan data associated therewith. The present invention also comprises a method of determining scanning probe microscope tip effects. The method comprises the steps of scanning a feature or artifact with a plurality of different type scanning tips, resulting in a plurality of scan data sets associated with the different type scanning tips. The tip effects associated with the different type scanning tips are then deconvolved using the plurality of scan data sets.

26 Claims, 17 Drawing Sheets

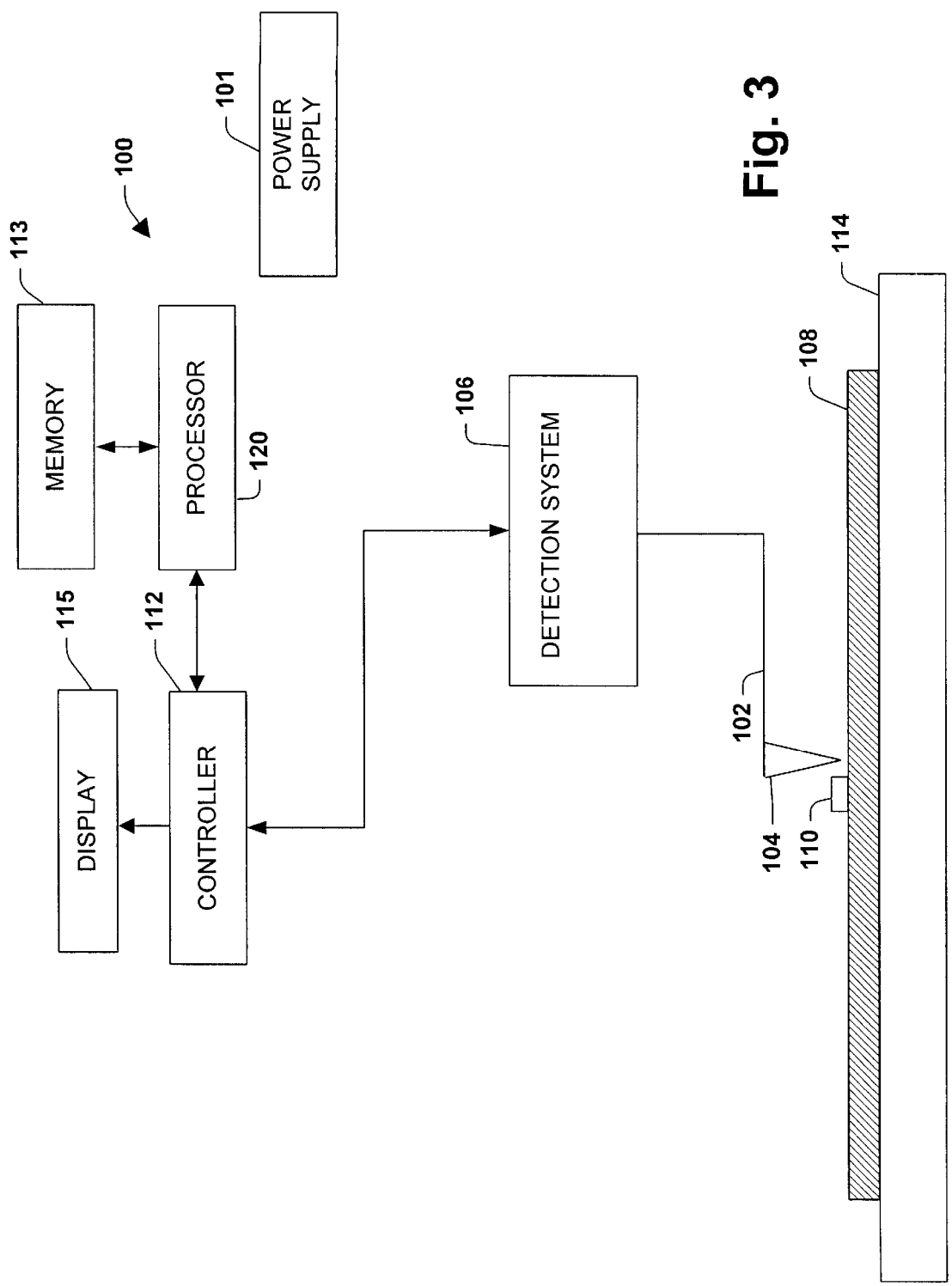

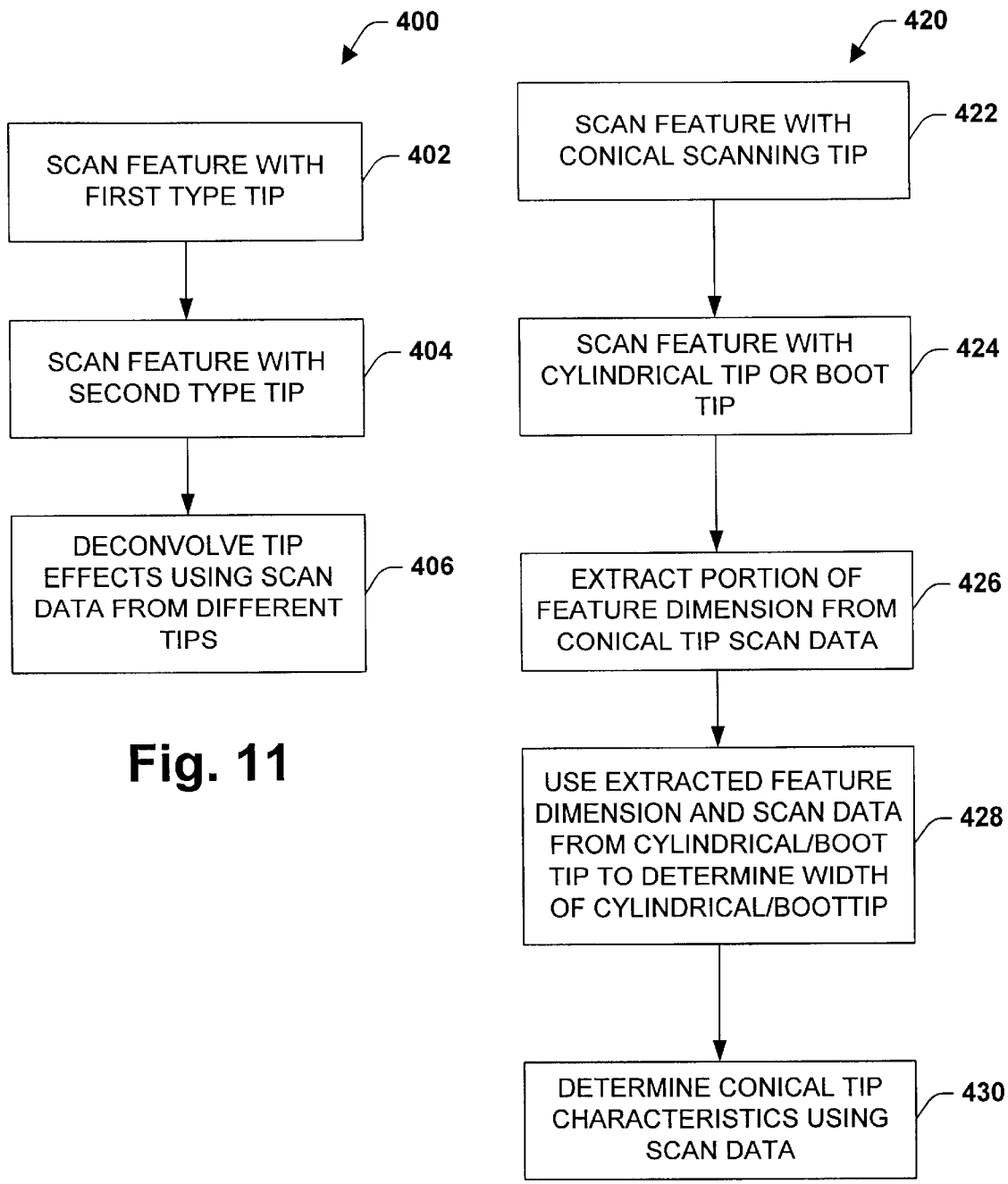

USE OF MULTIPLE TIPS ON AFM TO DECONVOLVE TIP EFFECTS

RELATED APPLICATION

This application claims priority to Ser. No. 60/242,650 filed Oct. 24, 2000, which is entitled "Use of Multiple Tips on AFM to Deconvolve Tip Effects".

TECHNICAL FIELD

The present invention relates to nanometerology and in particular to systems and methods for deconvolving tip effects associated with scan data in scanning probe microscopy.

BACKGROUND OF THE INVENTION

In the semiconductor industry, there is a continuing trend toward higher device densities. To achieve these high densities there has been and continues to be efforts toward scaling down the device dimensions (e.g., at submicron levels) on semiconductor wafers. In order to accomplish such high device packing density, smaller and smaller feature sizes are required. This may include the width and spacing of interconnecting lines, spacing and diameter of contact holes, and the surface geometry such as corners and edges of various features.

The requirement of small features with close spacing between adjacent features requires high resolution photolithographic processes. In general, lithography refers to processes for pattern transfer between various media. It is a technique used for integrated circuit fabrication in which a silicon slice, the wafer, is coated uniformly with a radiation-sensitive film, the resist, and an exposing source (such as optical light, x-rays, etc.) illuminates selected areas of the surface through an intervening master template, the mask, for a particular pattern. The lithographic coating is generally a radiation-sensitive coating suitable for receiving a projected image of the subject pattern. Once the image is projected, it is indelibly formed in the coating. The projected image may be either a negative or a positive image of the subject pattern. Exposure of the coating through a photomask causes the image area to become either more or less soluble (depending on the coating) in a particular solvent developer. The more soluble areas are removed in the developing process to leave the pattern image in the coating as less soluble polymer.

Due to the extremely fine pattern dimensions employed in present day integrated circuits, techniques are being generated to help accurately measure such dimensions. One generic class of tools employed for such high accuracy measurements is the scanning probe microscope (SPM). Generally, scanning probe microscopy provide pictures of atoms on or in surfaces, thereby providing atomic level surface imaging. One form of a Scanning Probe Microscope is an Atomic Force Microscope (AFM), which is sometimes alternatively referred to as a Scanning Force Microscope (SFM). AFMs include a sensor with a spring-like cantilever rigidly mounted at one end and having a scanning tip at a free end. AFMs may operate in contacting and non-contacting modes. In the contacting mode, the tip of an AFM is placed in low force contact with a surface of a semiconductor wafer or other workpiece of interest. The workpiece is then displaced relative to the AFM in one or more directions in a plane (e.g., the tip contacts the workpiece in a Z axis while the workpiece is displaced in the X and/or Y directions), to effect a scanning of the workpiece surface. As surface contours or other topographic features are encountered by the tip during scanning, the cantilever deflects. The cantilever deflection is then measured, whereby the topography of the workpiece may be determined.

In non-contacting operation, the tip is held a short distance, typically 5 to 500 Angstroms, from the workpiece surface, and is deflected during scanning by various forces between the workpiece and the tip. Such forces may include magnetic, electrostatic, and van der Waals forces. In both the contacting and non-contacting modes, measurements of a workpiece topography or other characteristic features are obtained through measuring the deflection of the cantilever. Deflection of the cantilever may be measured using precisely aligned optical components coupled to deflection measurement circuitry, although other techniques are sometimes employed.

Another form of SPM is a Scanning Tunneling Microscope (STM). Where a feature of interest is non-topographic, AFMs as well as STMs may be utilized used to measure the workpiece feature. Examples of non-topographic features include the detection of variations in conductivity of a semiconductor workpiece material. An AFM can be used to scan a workpiece in the non-contacting mode during which deflections in the cantilever are caused by variations in the workpiece conductivity or other property of interest. The deflections can be measured to provide a measurement of the feature. STMs include a conductive scanning tip which is held in close proximity (within approximately 5 Angstroms) to the workpiece. At this distance, the probability density function of electrons on the tip spatially overlap the probability density function of atoms on the workpiece. Consequently, a tunneling current flows between the workpiece surface and the tip if a suitable bias voltage is applied between the tip and the workpiece. The workpiece and tip are relatively displaced horizontally (in the X and/or Y directions) while the tip is held a constant vertical distance from the workpiece surface. The variations in the current can be measured to determine the changes in the workpiece surface.

In another mode of operation, an STM can be used to measure topography. The scanner moves the tip up and down while scanning in the X and/or Y directions and sensing the tunneling current. The STM attempts to maintain the distance between the tip and the surface constant (through moving the tip vertically in response to measured current fluctuations). The movements of the tip up and down can be correlated to the surface topography profile of a workpiece.

In both types of SPMs, the dimensions of the scanning tip is important. By knowing the dimensions of the tip, correction factors may be used to correct scan data to thereby remove the impact of the scanning tip itself from the measurement, in order to improve the accuracy of the measurement. Such tip dimensions are typically determined by taking physical measurements of the tips or using some type of known calibration standard. Such processes may be burdensome and are static, meaning they do not account for scanning tip changes over time, for example, due to wear. There is a need in the art for more systems and methods for ascertaining scanning tip effects.

SUMMARY OF THE INVENTION

The present invention relates to a system and method of determining a tip dimension associated with a scanning probe microscope.

In accordance with one aspect of the present invention, a method of deconvolving the effects of a scanning tip in a scanning probe microscope is effectuated using multiple, different type scanning tips to scan an artifact such as a feature. For example, by scanning a feature with a conical type scanning tip, a feature width associated with a top portion of the feature is ascertained without knowledge of the conical tip dimensions. The feature is then scanned by another scanning tip such as a cylindrical type tip to generate a scan profile associated therewith. Using the top feature portion information gathered by the conical tip, and taking the cylindrical tip scan profile into account, the width of the cylindrical tip may be determined readily. In addition, once the cylindrical scanning tip is determined, the radius of curvature associated with the conical tip may be determined.

In accordance with another aspect of the present invention, a system for deconvolving the effects of a scanning tip is disclosed. The system comprises a scanning probe microscope having one or more cantilevers and a scanning tip(s) associated therewith. The system further comprises a processor which is adapted to monitor a deflection of the cantilever as the scanning tip is scanned across an artifact such as a feature and generate a scan signal associated with the scanning position and deflection of the scanning tip/cantilever assembly. The processor is further adapted to take the scan signals associated with multiple scans of the artifact using different types of scanning tips to deconvolve the tips effects of the various type tips in the respective scan signals.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 3 is a block diagram illustrating a system for deconvolving tip effects according to the present invention;

FIG. 11 is a flow chart illustrating a method of deconvolving tip effects using scan data from multiple, different type scanning tips according to the present invention;

FIG. 12 is a flow chart illustrating a method of determining tip characteristics using scan data from multiple, different type scanning tips according to the present invention.

DETAILED DESCRIPTION OF THE INVENTION

The present invention relates to a system and method of deconvolving the tip effects associated with scan signals in scanning probe microscopes. Such tip effects are deconvolved by determining the scanning tip dimensions and using such tip dimensions as offset type correction factors to determine various type feature dimensions. The scanning tip dimensions are determined by scanning an artifact such as a patterned feature with multiple, different type scanning tips. Such scans generate scan signals which are associated with the style and dimensions of the scanning tips. By analyzing the different scan signals, the tip dimensions are determined and are then available for use as correction factors in present or subsequent feature measurements.

Figure 1A:
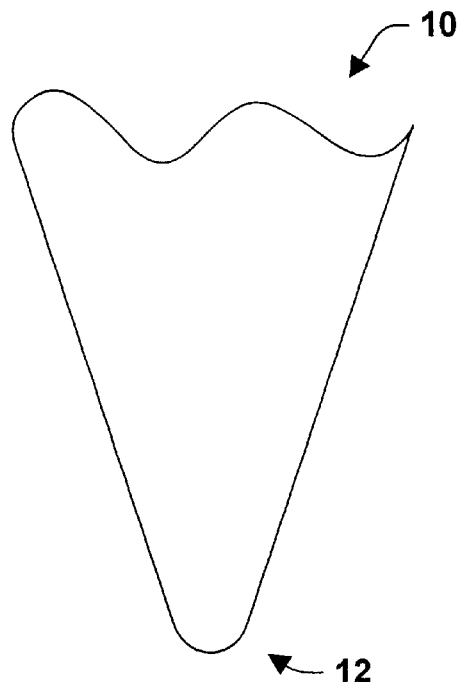
FIGS. 1a and 1b are cross section diagrams illustrating a conical type scanning tip.
Figure 1B:
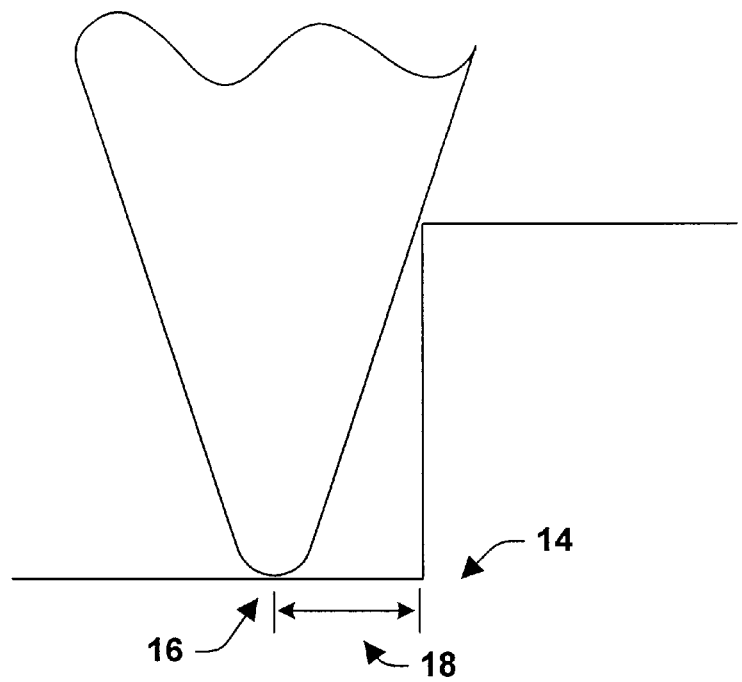

Turning now to the figures, FIG. 1a illustrates a conical type scanning tip 10 employed within a scanning probe microscope. The conical tip 10 has an end 12 which makes contact with or is located near a surface of interest (depending upon whether or not the SPM is in a contact mode). The tip end 12 is not infinitesimally small, but instead exhibits a finite tip width which must be taken into account when measuring a feature dimension. For example, as illustrated in FIG. 1b, when a tip scans a feature and abuts a feature transition 14, a location 16 at which the tip center resides does not correspond to the transition 14 exactly, but instead is shifted an amount 18 which is related to the tip dimension. If, for example, the tip 10 is perfectly conical, then the offset 18 corresponds to a radius of curvature of the tip end 14 and a height of the feature of interest. In many cases, however, the tip 10 is not perfectly conical and therefore the offset 18 may vary based on the orientation of the tip 10.

Figure 2A:
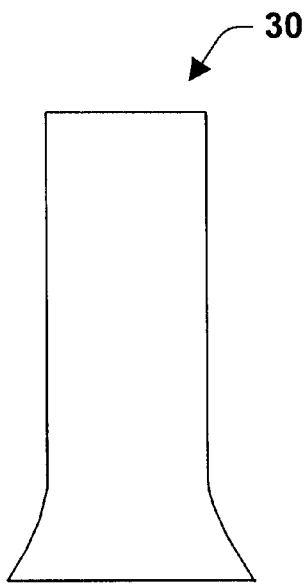
FIGS. 2a–2c are cross section diagram illustrating boot type scanning tips and a cylindrical scanning tip, respectively.
Figure 2B:
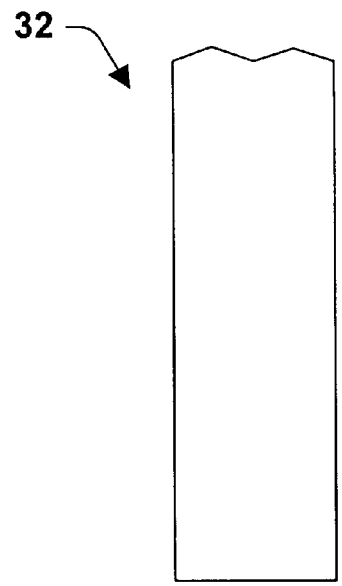
Figure 2C:
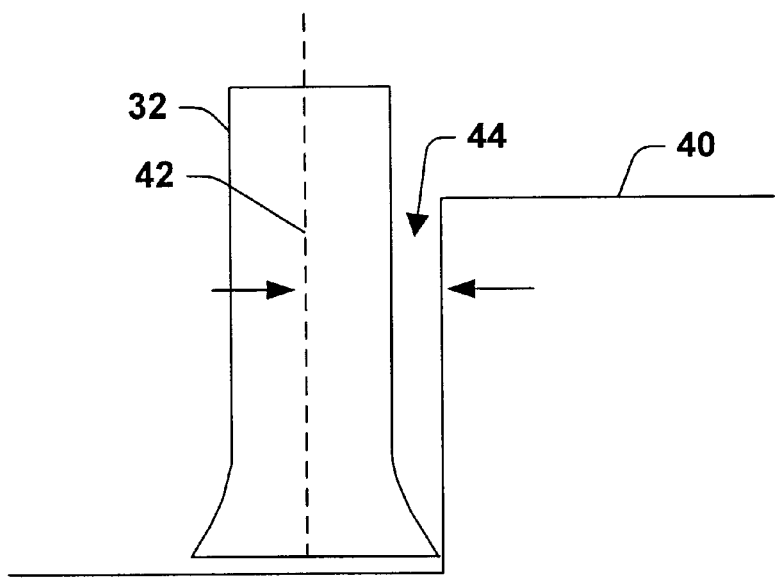

Other types of scanning tips are also utilized in conjunction with SPM systems. For example, a cylindrical type scanning tip and a boot type scanning tip are often employed, as illustrated in FIGS. 2a and 2b, respectively, and designated at reference numerals 30 and 32. Similar to the conical type tip 10 of FIG. 1a, the other tips 30 and 32 are not infinitesimally small and their finite tip widths result in scan signals which do not correspond exactly to the scanned feature. For example, in FIG. 2c, a feature 40 is scanned with the boot tip 32. Due to the finite tip width, the scan path 42 does not follow the feature 40 exactly, but instead is offset by an amount 44 which is associated with the tip width. A similar error or offset is also experienced with cylindrical type scanning tips. The inventors of the present invention have discovered that the scanning signals associated with the various types of scanning tips for the same feature may be utilized to deconvolve the effects of the scanning tips from the measurements and thereby ascertain readily the tip dimensions for use in present or subsequent measurements.

In accordance with one aspect of the present invention, an artifact such as a patterned feature is scanned using multiple, different type scanning tips using, for example, an SPM. A scan signal associated with each of the different scanning tips is then utilized to determine the dimensions associated with scanning tips, respectively. Turning now to FIG. 3, an exemplary scanning system 100 is illustrated. The scanning system 100 comprises, for example, a cantilever arm 102 having a scanning tip 104 associated therewith. A detection system 106 is associated with the cantilever arm 102 and is operable to detect a deflection associated therewith as the tip 104 scans a sample such as a wafer 108 having a patterned feature 110 thereon.

The scanning system 100 further comprises a controller 112 which is operably coupled to the detection system 106 and converts deflection data (e.g., in the Z-direction) from the detection system into a scan signal. In addition, the controller 112 is operable to control an X-Y position of the scanning tip 104 via the cantilever 102, or alternatively, an X-Y position of a stage 114 in order to control a scan rate and direction, respectively. Accordingly, as the controller 112 knows the X-Y position and scan rate/direction of the deflection of the scanning tip 104, the controller 112 is adapted to generate a scan signal which reflects the scan path of the tip over the feature 110.

A processor 120 is associated with the controller 112, for example, being integrated with the controller 112 or operably coupled thereto, as may be desired. The processor 120 is configured or otherwise adapted to take the scan signal data generated by the controller 112 for various types of different scanning tips and deconvolve the tip effects from the scan signals in the following exemplary manner.

Figure 4A:
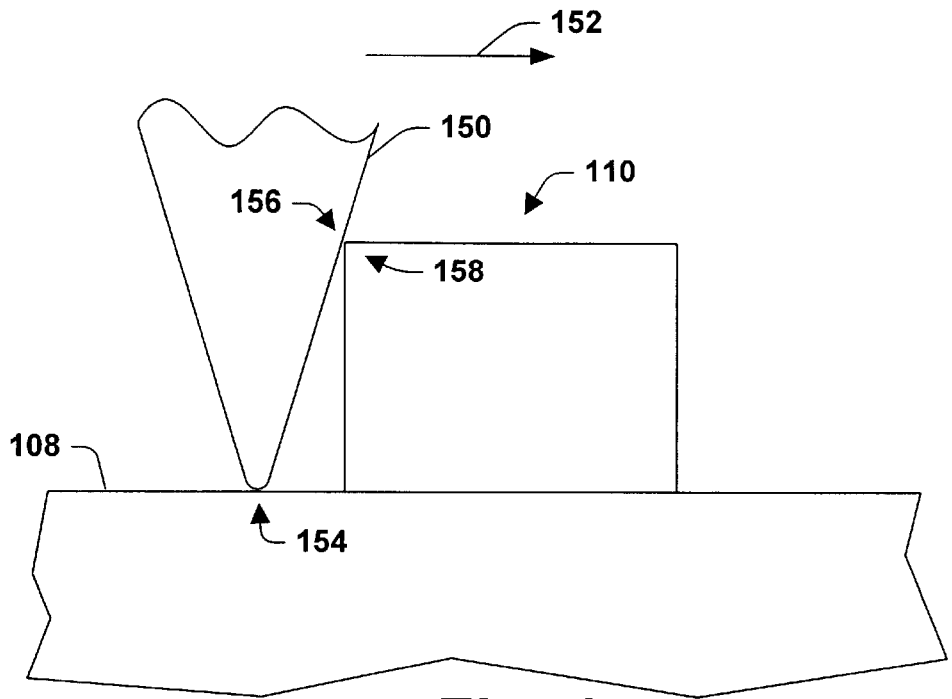
FIGS. 4a–4d are cross section diagrams illustrating the scanning of a feature or artifact with a conical type scanning tip.

The scanning system 100 employs a first type of scanning tip, for example, a conical type scanning tip, as illustrated in FIG. 4a and designated at reference numeral 150. The system 100, via the controller 112 initiates a scan of the feature 110 residing on a surface 108, for example, a semiconductor substrate. The conical scanning tip 150 scans across the surface 108 in the direction of an arrow 152 to measure the linewidth and/or analyze the profile of the feature 110. Note, however, at a tip position 154 shown in FIG. 4a, that an edge 156 of the scanning tip 150 contacts a corner 158 of the feature 110 and the tip 150 can no longer scan along the surface 108, but instead must ride up against the feature.

Figure 4B:
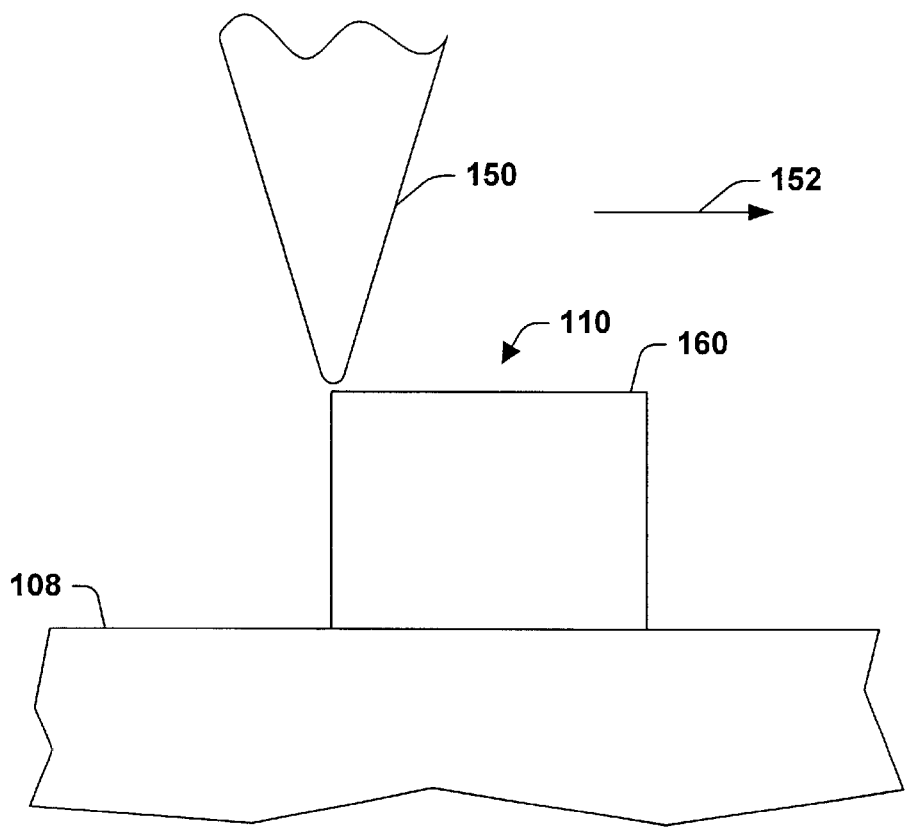
Figure 4C:
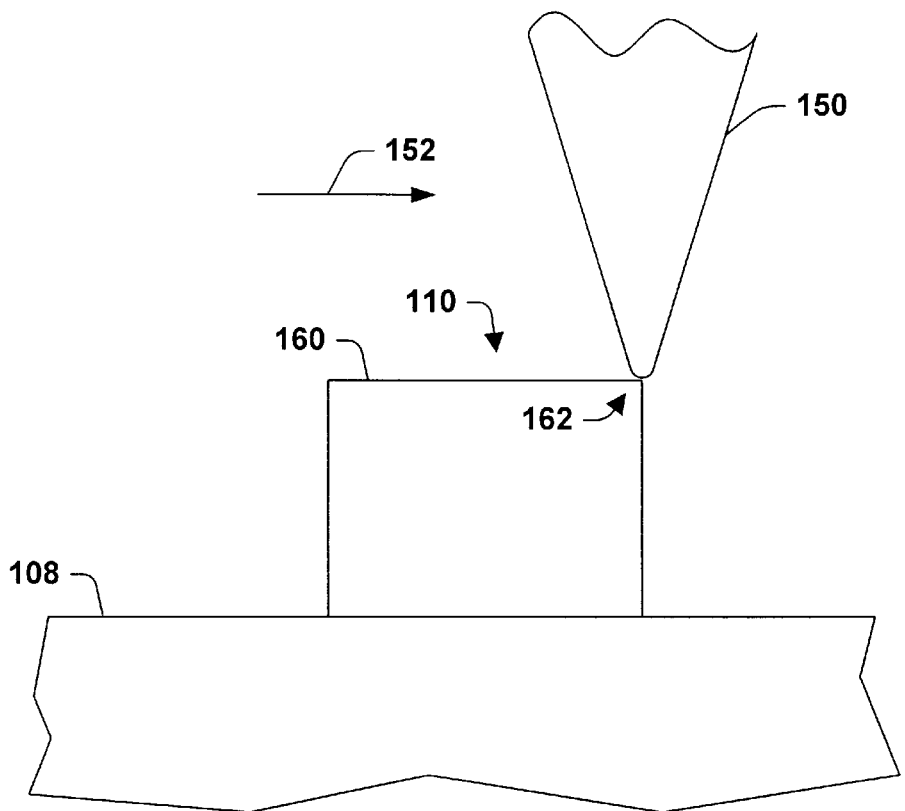
Figure 4D:
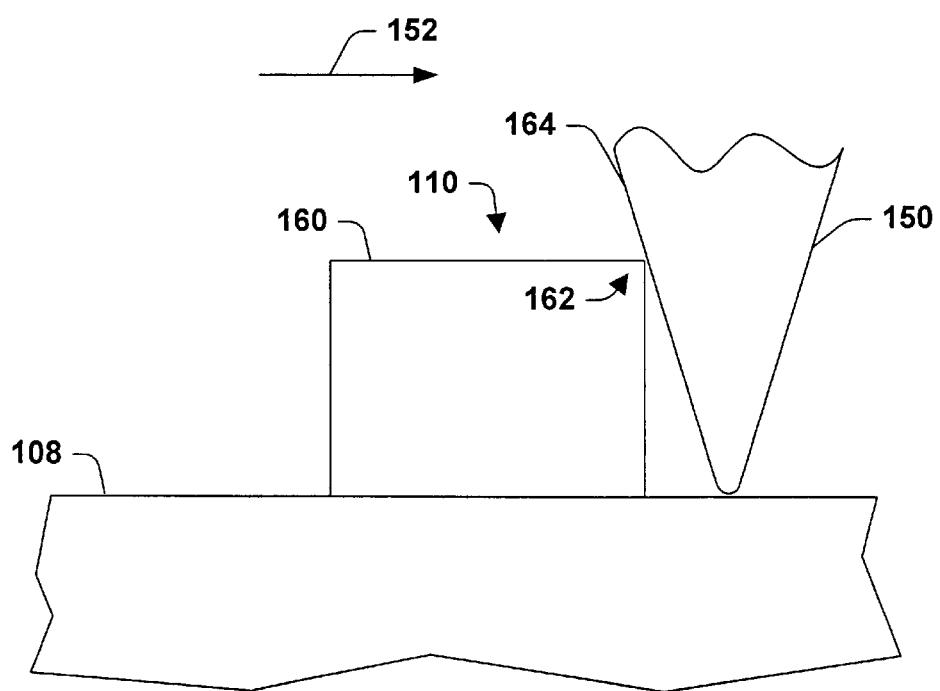

Once the scanning tip rides up along the corner 158 of the feature 110, the scanning tip 150 will rest on a top surface 160 of the feature 110, as illustrated in FIG. 4b. The scanning tip 150 then continues to scan in the direction 152 along the top surface 160 until the tip 150 reaches a second corner 162, as illustrated in FIG. 4c. Subsequently, an edge 164 of the tip 150 will ride along the feature corner 162 until the tip 150 again reaches the surface 108, as illustrated in FIG. 4d.

Figure 4E:
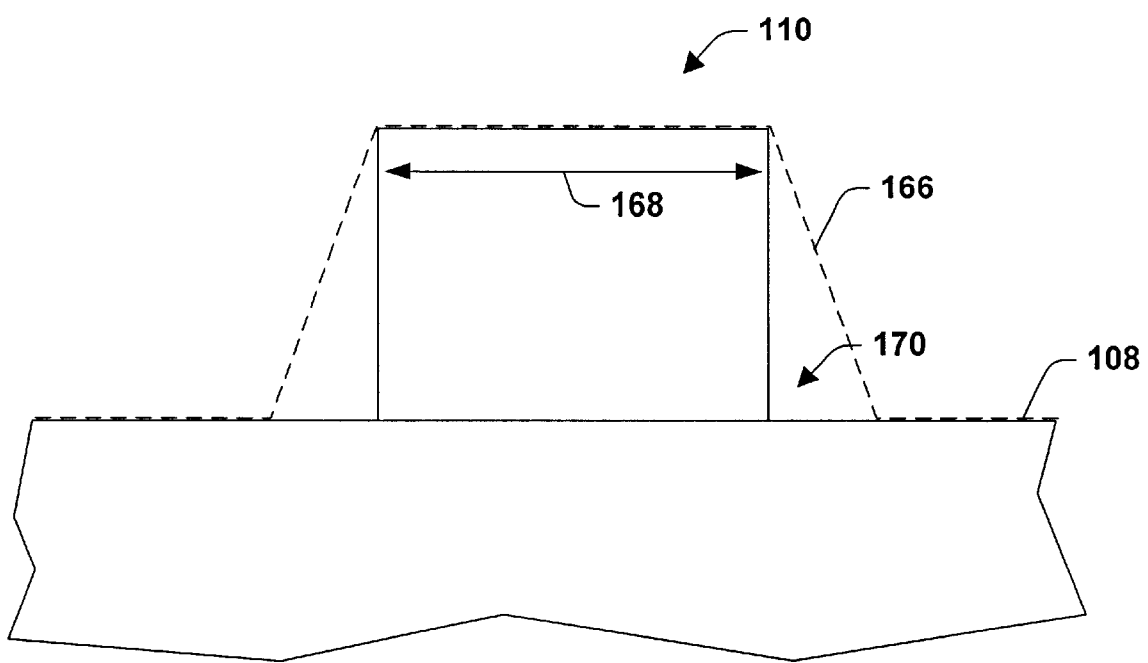
FIG. 4e is a cross section diagram illustrating a scan data set associated with the scanning of the feature or artifact of FIGS. 4a–4d.

Note that the tip 150 traverses a path which does not exactly coincide with the feature 110. Due to the conical shape thereof, the scan path of the tip 150 is generally trapezoidal in shape, as illustrated in FIG. 4e and designated at reference numeral 166. The controller 112 of the present invention generates a signal or scan data set associated with the scan path 166 and provides such a scan signal or scan data set to the processor 120. Using the signal associated with the scan path 166, the processor 120 determines a width of a top portion 168 of the feature 110. Such a determination is made, for example, by determining a distance along the scan direction 154 in X-Y type coordinates associated with the controller 112.

Although the scan path 166 does not provide meaningful information regarding a lower portion 170 of the feature 110, the portion of the scan 172 corresponding to the scan portion which traverses the top of the feature 110 accurately reflects the dimension of the top portion 168. The processor 120 then stores the upper width data in an associated memory 113.

Figure 5A:
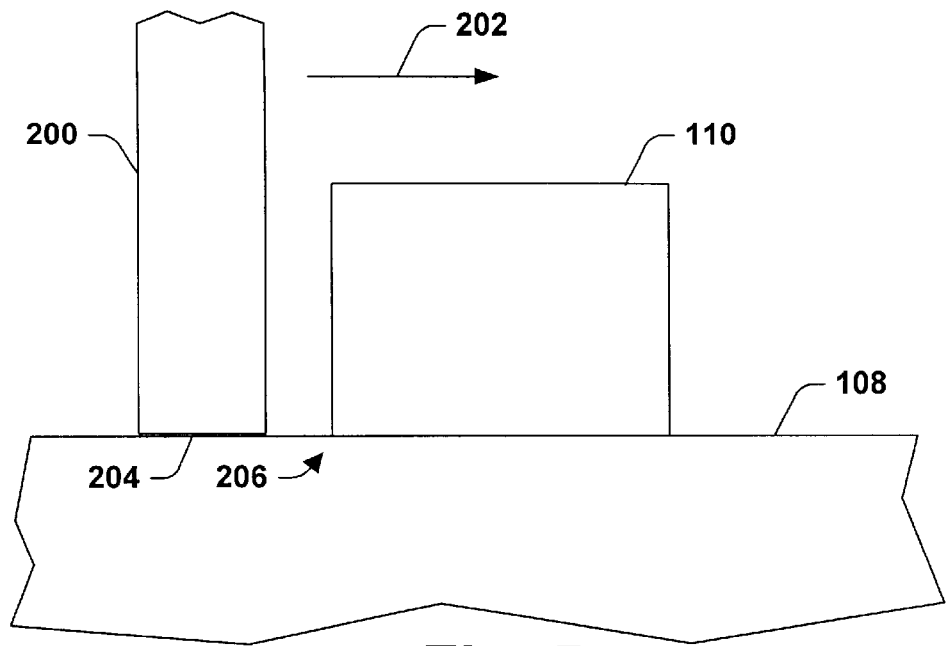
FIGS. 5a–5d are cross section diagrams illustrating the scanning of a feature or artifact with a cylindrical type scanning tip.

The scanning system 100 of the present invention then scans the feature 110 again with a different type of scanning tip, for example, a cylindrical type tip as illustrated in FIG. 5a and designated at reference numeral 200. The cylindrical type scanning tip 200 exhibits a diameter or a cross sectional area that is substantially constant along at least a portion of its length. This dimensional characteristic makes the scanning tip advantageous for obtaining certain types of feature profiles.

Figure 5B:
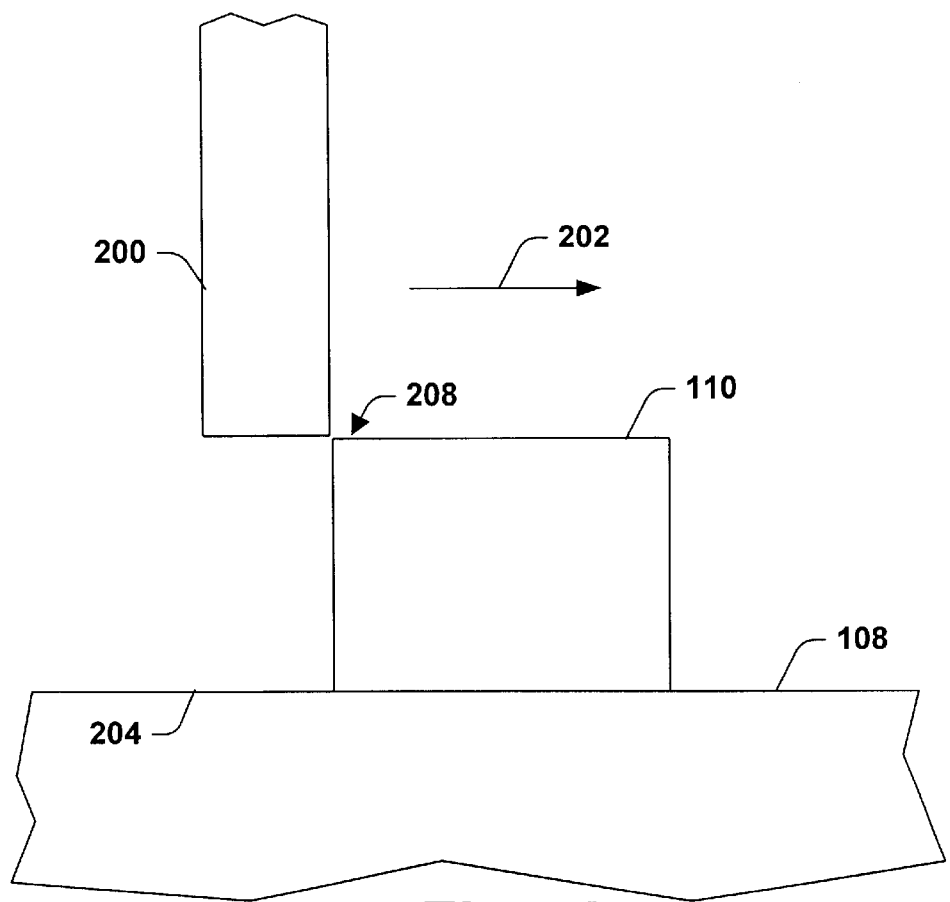
Figure 5C:
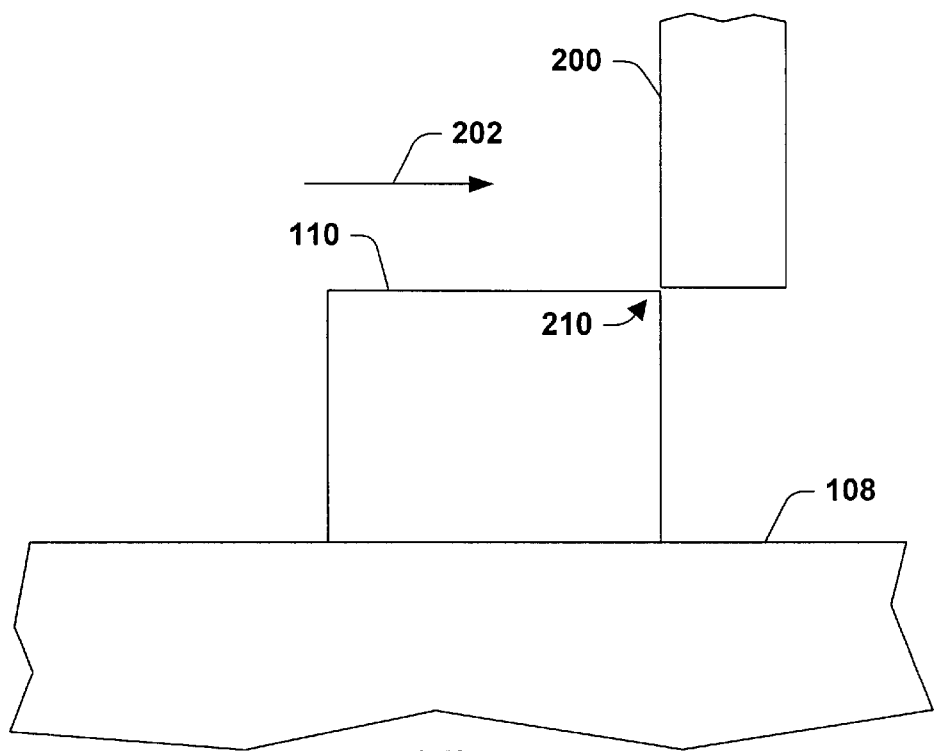
Figure 5D:
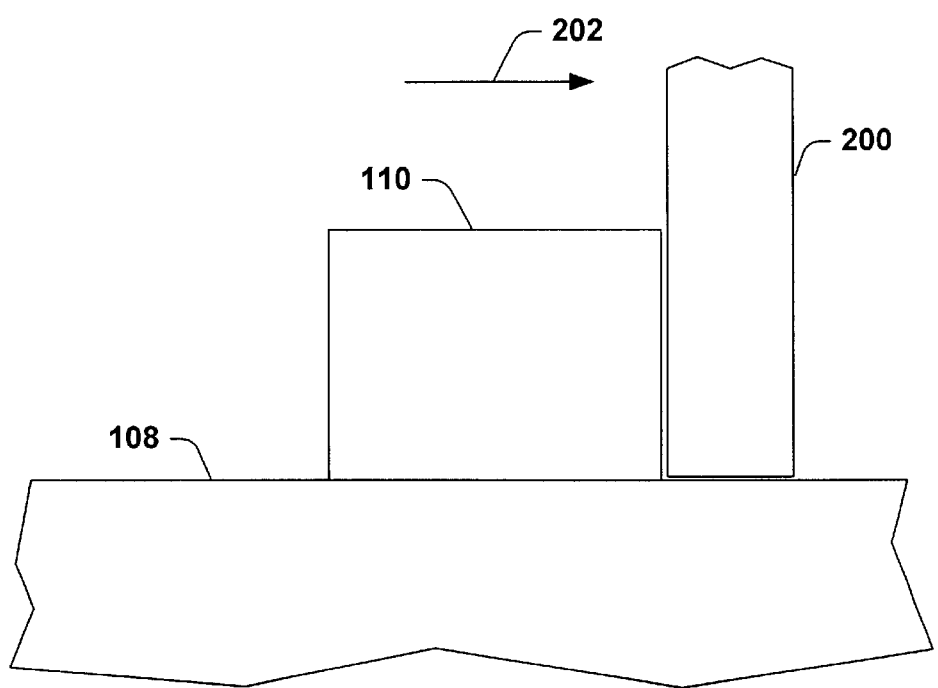

As shown in FIG. 5a, the feature 110 residing on the surface 108 is scanned by the cylindrical scanning tip 200 along a direction of the arrow 202. Due to the generally constant diameter or cross section of the cylindrical scanning tip 200, once the tip 200 encounters the feature 110, a bottom tip portion 204 is in the corner 206 of the feature/substrate interface and the data associated with the corner 206 is collected. Similarly, as the cylindrical scanning tip 200 continues to scan along the direction of arrow 202, the tip 200 rises up generally vertically along the feature 110 and comes to a first top corner 208 associated therewith, as illustrated in FIG. 5b. At the corner 208, the tip 200 scans in a generally horizontal direction along arrow 202 across a top portion of the feature 110 until the tip 200 reaches a second top corner 210, as illustrated in FIG. 5c. The tip 200 then rides down along the feature 110 in a generally vertical manner until the tip 200 reaches the surface 108, as illustrated in FIG. 5d.

Figure 5E:
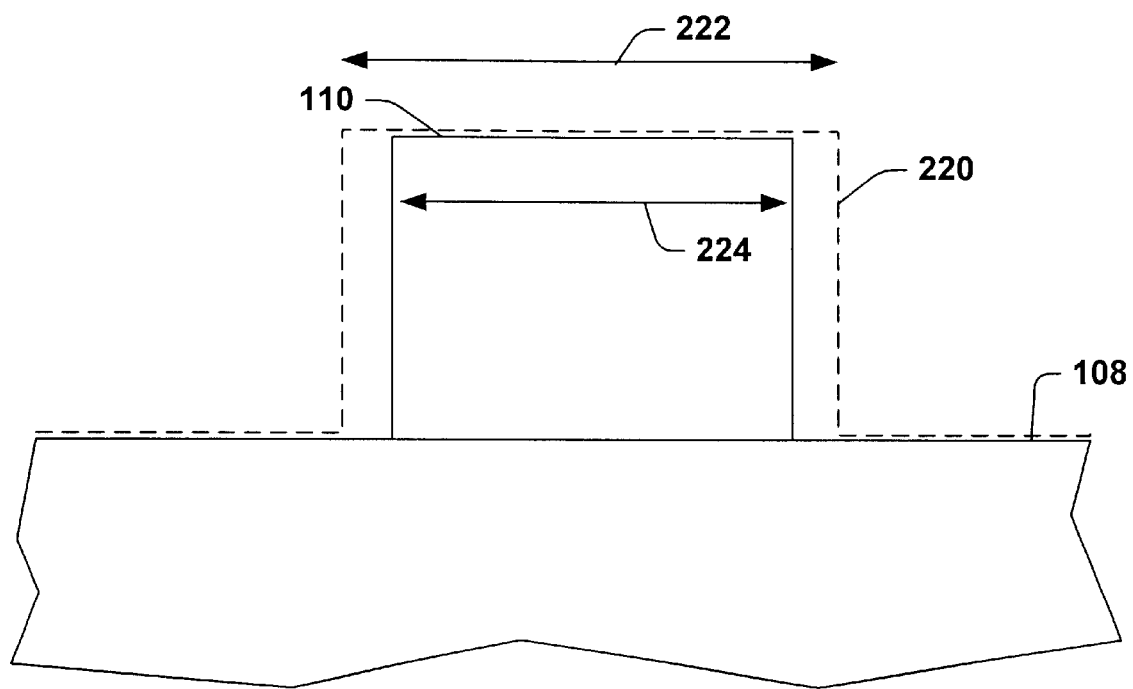
FIG. 5e is a cross section diagram illustrating a scan data set associated with the scanning of the feature or artifact of FIGS. 5a–5d.

Note that the tip 200 traverses a path which does not exactly coincide with the feature 110. Due to the finite width thereof, a scan path 220 of a mid-portion of the tip 200 generally reflects the rectangular feature shape, but exhibits a width 222 which is larger than an actual feature width 224, as illustrated in FIG. 5e. The controller 112 of the present invention generates a signal or scan data set associated with the scan path 220 and provides such a scan signal or scan data set to the processor 120. Using the signal associated with the scan path 220, the processor 120 stores the upper width data in the associated memory 113.

The processor 120 now has multiple scan data sets associated with multiple, different type scanning tips. According to the present invention, the processor 120 uses the top portion of the scan signal associated with the conical tip along with the width data associated with the cylindrical tip to determine the width of the cylindrical scanning tip. More particularly, the scan signal associated with the cylindrical scanning tip reflects a width that is greater than the actual feature and the difference reflects the finite cylindrical tip width (see, e.g., FIG. 5e). Therefore by subtracting the top feature portion data from the conical tip scan data from the width data of the cylindrical tip scan data, the cylindrical tip width is determined. This operation is illustrated graphically in FIG. 6.

Figure 6:
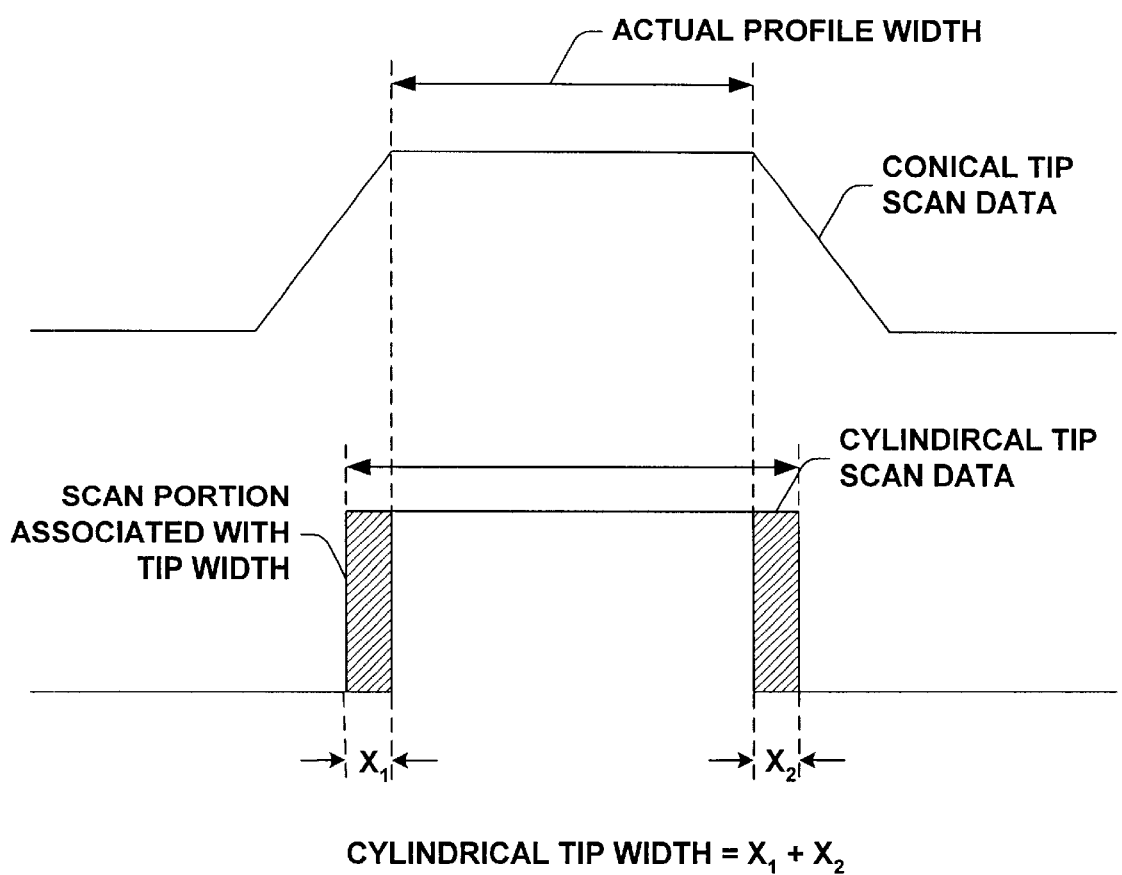
FIG. 6 is a diagram illustrating the scan data sets of FIGS. 4e and 5e, and use of such scan data sets in deconvolving tip effects in accordance with the present invention.

As seen in FIG. 6, the shaded portions of the cylindrical tip scan data represent the offset due to the finite cylindrical scanning tip width. Since the cylindrical scanning tip may not be exactly symmetrical about its mid-point, the distances $X_1$ and $X_2$, representing the difference associated with each side, may be added together ($X_1+X_2$) to calculate a width of the cylindrical tip. Alternatively, since the cylindrical scanning tip approximates an actual cylinder, the processor 120 may also take the data associated with one of the shaded regions (e.g., $X_1$) and assume that $X_1=X_2$, wherein the tip width is determined as: tip width=$2X_1$. Other alternative calculations may also be employed with the above data and such alternatives are contemplated as falling within the scope of the present invention.

In addition, using the collected scan data, a radius of curvature of the conical scanning tip may be determined. Using either the conical tip scan data or the cylindrical tip scan data, a height (h) of the feature 110 may be readily determined based on an amount of Z-direction deflection of the cantilever 102 (see, e.g., FIG. 7a). Alternatively, the processor 120 may use the average height ($h_{avg}=(h_1+h_2)/2$) obtained by the conical tip and the cylindrical tip, respectively, for use in determining the characteristics of the conical tip. The processor 120 then calculates the width distances ($w_1$ and $w_2$) associated with the conical scanning tip where the tip contacts the feature 110 on a side edge and begins to ride up therealong. Because the conical scanning tip may not be perfectly symmetric, both width distances $W_1$ and $W_2$ are obtained from the scan data. Alternatively, however, symmetry may be assumed and only one of the pieces of data are collected. In yet another alternative aspect of the present invention, $w_1$ and $w_2$ may be averaged together.

The processor 120 takes the above data pieces by extraction from the scan data and calculates half-angles of the conical tip ($\theta_1$ and $\theta_2$) using, for example, trigonometry. For example, $\theta_1$ may be determined as $\theta_1=\sin^{-1}(w_1/h)$ and $\theta_2=\sin^{-1}(w_2/h)$, as illustrated in FIG. 7b. The total conical tip angle $\theta_{tip}$ is then $\theta_1+\theta_2$, which may be used subsequently in correction factors associated with the conical scanning tip. According to one exemplary aspect of the present invention, the tip angle $\theta_{tip}$ can be assumed as being constant with respect to its orientation (symmetrical). Alternatively, one can vary an orientation of the conical scanning tip (e.g., rotating the tip 90 degrees) and repeat the above procedure one or more times to more fully characterize the shape of the conical scanning tip, as may be desired.

The above described system 100 provides for a determination of scanning tip dimensions without directly measuring the tip by scanning a feature using multiple type scanning tips and deconvolving the tip effects from the resulting scan data. Although the above example utilized a conical scanning tip and a cylindrical scanning tip, the same procedure may be employed using a conical tip and a boot tip, wherein the boot tip scan data is utilized by the processor 120 in a manner similar to that of the cylindrical tip to ascertain the tip dimensions of the conical tip and the boot tip, respectively.

Figure 8A:
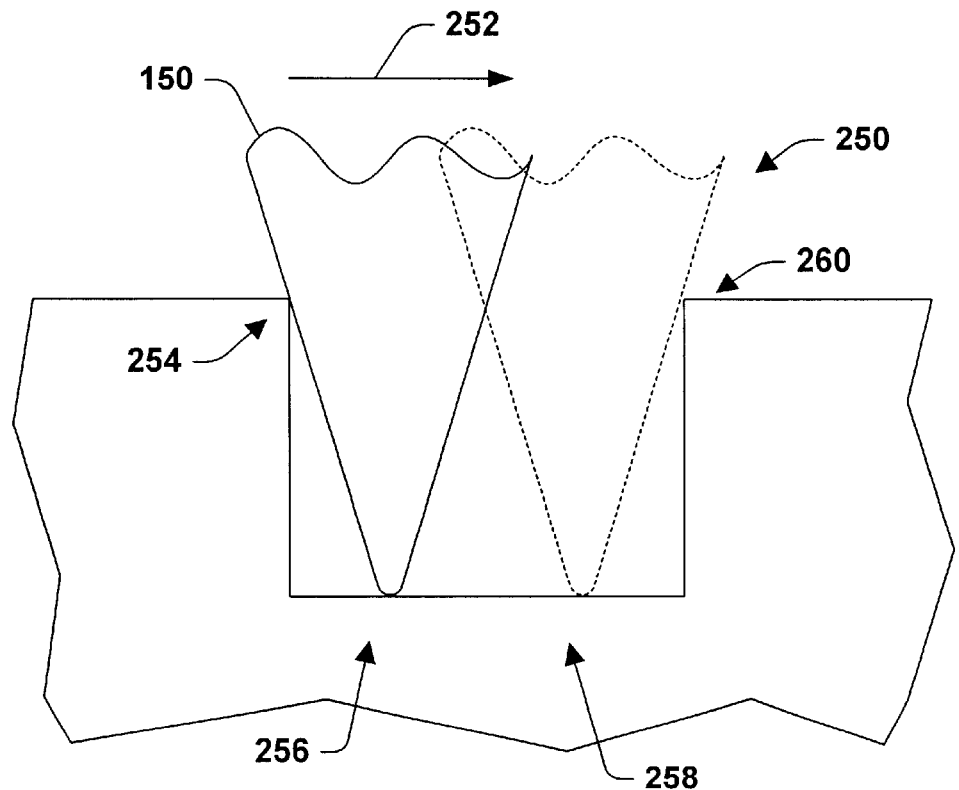
FIGS. 8a–9b are cross section diagrams illustrating applicability of the present invention to other type features such as contact holes.
Figure 8B:
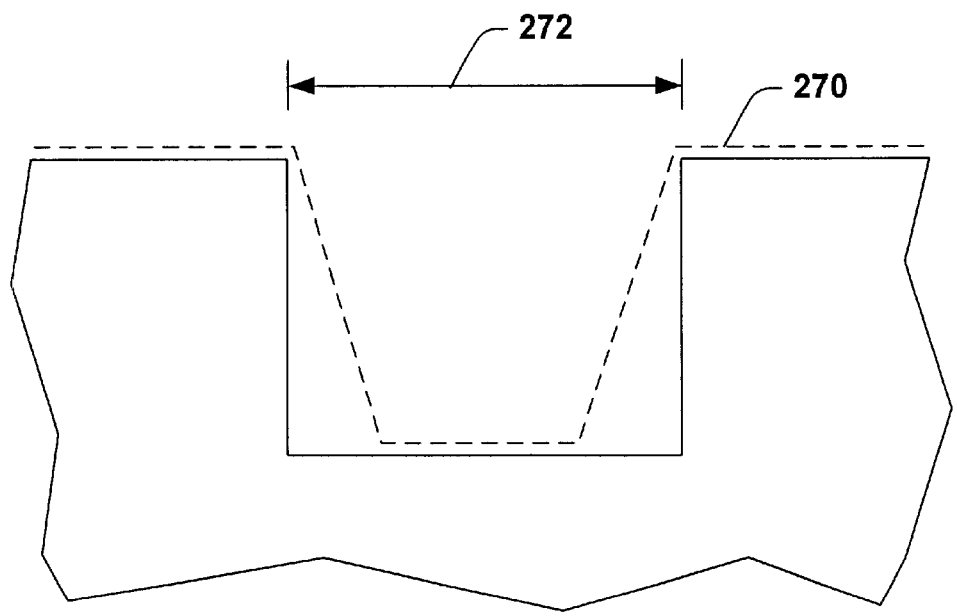

In the above exemplary discussion of the present invention, the feature employed in the analysis was a line-type feature, wherein the figures illustrate a cross section thereof. It should be noted, however, that the present invention may be equally applicable with respect to other types of features, for example, mesas, trenches, contact holes, etc. For example, FIG. 8a illustrates the scanning system 100 of FIG. 3 scanning a contact hole 250 with the conical scanning tip 150 in a scanning direction 252. The conical tip 150 rides down along a first corner 254 and makes contact at a bottom portion 256 of the contact hole 250. The tip 150 then continues in the scan direction 252 until the tip reaches a point 258, wherein the tip 150 begins to ride up along a corner 260. The scan data relating to the scan of FIG. 8a is illustrated in FIG. 8b and designated at reference numeral 270. Note that although the conical tip 150 does not accurately collect data associated with the bottom corners of the contact hole 250, the top opening portion reflecting a width 272 is accurately reflected therein. The processor 120 takes the conical tip scan data from the controller 112 and stores such data in the associated memory 113.

Figure 9A:
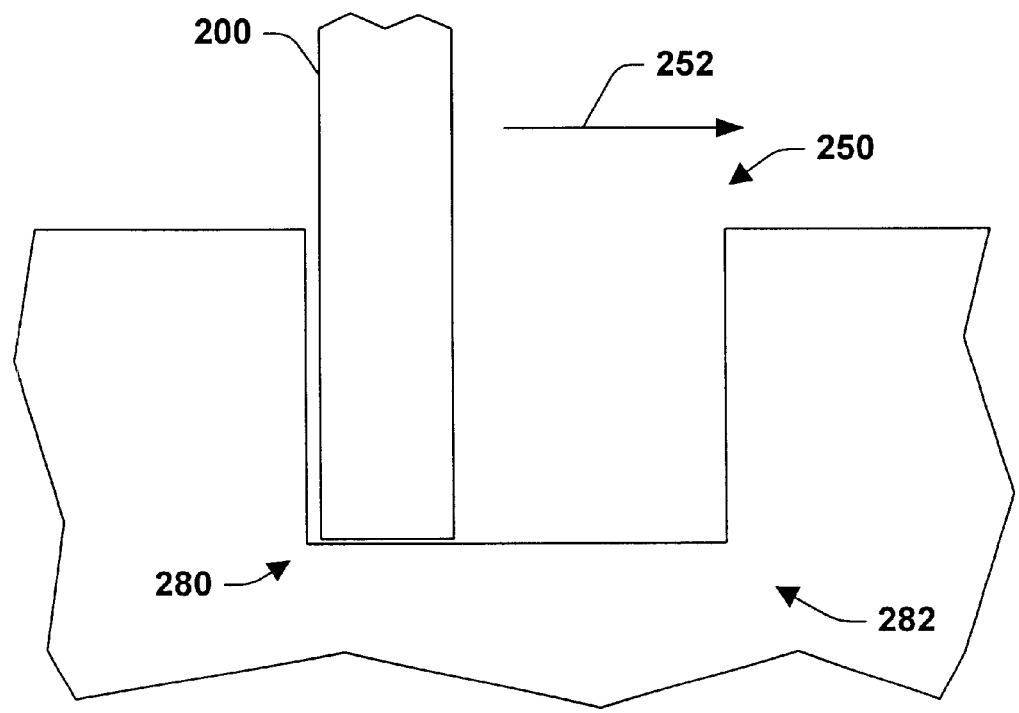

The system 100 then scans the contact hole 250 again with another type tip such as a boot tip or a cylindrical tip. Scanning the contact hole 250 with a cylindrical tip 200 along the scanning direction 252, as illustrated in FIG. 9a. The tip 200 traces out a scanning path which does not reflect the contact hole 250 exactly, due to the finite width thereof, but does collect data which reflects the bottom corners 280 and 282 of the contact hole which the conical tip 150 is unable to collect. Scan data associated with the cylindrical tip is illustrated in FIG. 9b and designated at reference numeral 290.

Figure 7A:
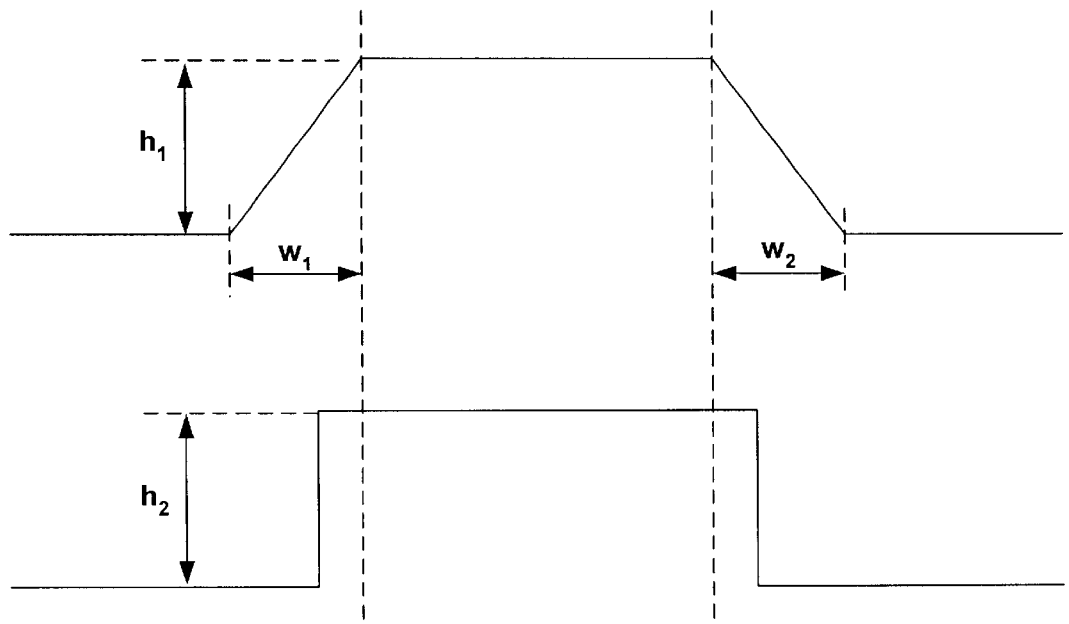
FIGS. 7a and 7b are diagrams illustrating the scan data sets of FIGS. 4e and 5e, and use of such scan data sets in deconvolving tip effects in accordance with the present invention.
Figure 7B:
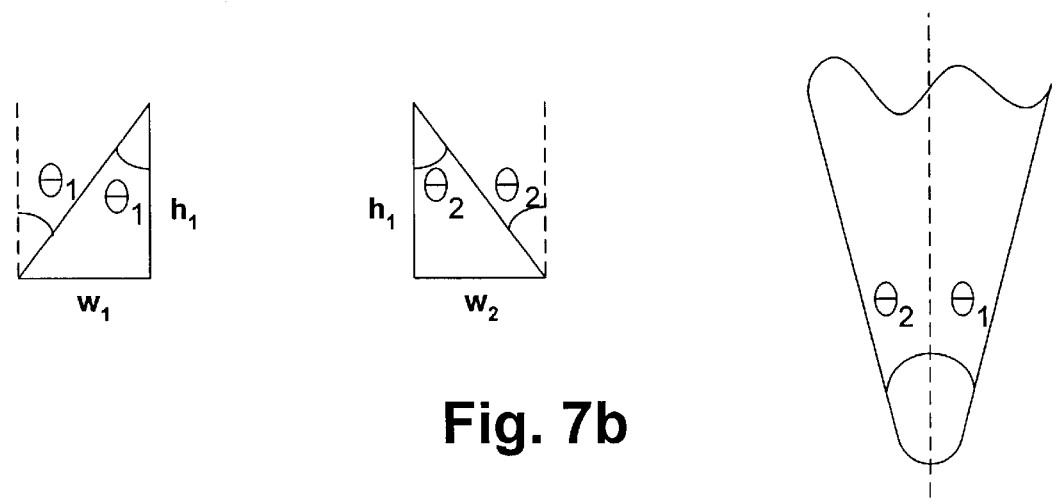
Figure 9B:
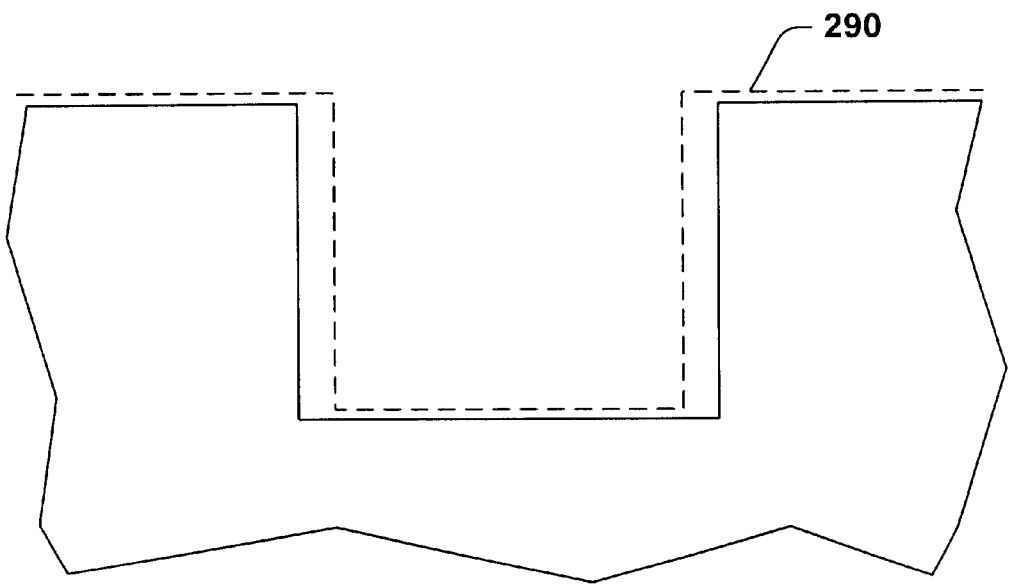

By using the scan data 270 and 290 of FIGS. 8b and 9b, respectively, the processor 120 determines a width associated with the cylindrical tip in a manner similar to that described above in conjunction with FIG. 6 and a conical tip angle in a manner similar to that described in conjunction with FIGS. 7a and 7b.

As discussed above, the system 100 provides for a determination of tip effects without resorting to direct measurements thereof. Such a system is therefore conducive for implementation of various types of feature analysis with deconvolution and corresponding offset adjustments or correction factors occurring in real time. For example, the system 100 of FIG. 3 may employ two or more different type scanning tips with independent or shared deflection systems such that a feature under analysis will be scanned with each of the different tips simultaneously with each tip positioned closely together so that one can appreciate that substantially the same portion of the feature is being scanned. Alternatively, the multiple tips may be employed to scan the same portion of the feature in a serial fashion, as may be desired. In any event, the processor 120 (which may be integrated with the controller 112) uses the multiple tip scan data to deconvolve the tip effects and supply such information back to the controller 112 for use as offset information in providing a feature analysis output peripheral such as a display.

As discussed in the above examples of the present invention, only two different type of scanning tips were utilized in deconvolving the tip effects. In accordance with another aspect of the present invention, more than two different type of scanning tips may be employed. For example, a conical tip, a cylindrical tip and a boot tip may be used to each scan a feature and deconvolve tip effects associated therewith using the scan data. Such an implementation is beneficial in analyzing various types of features, for example, a re-entrant profile wherein a sidewall associated with the feature has a negative slope, for example, as illustrated in FIG. 10a and designated at reference numeral 300.

Figure 10A:
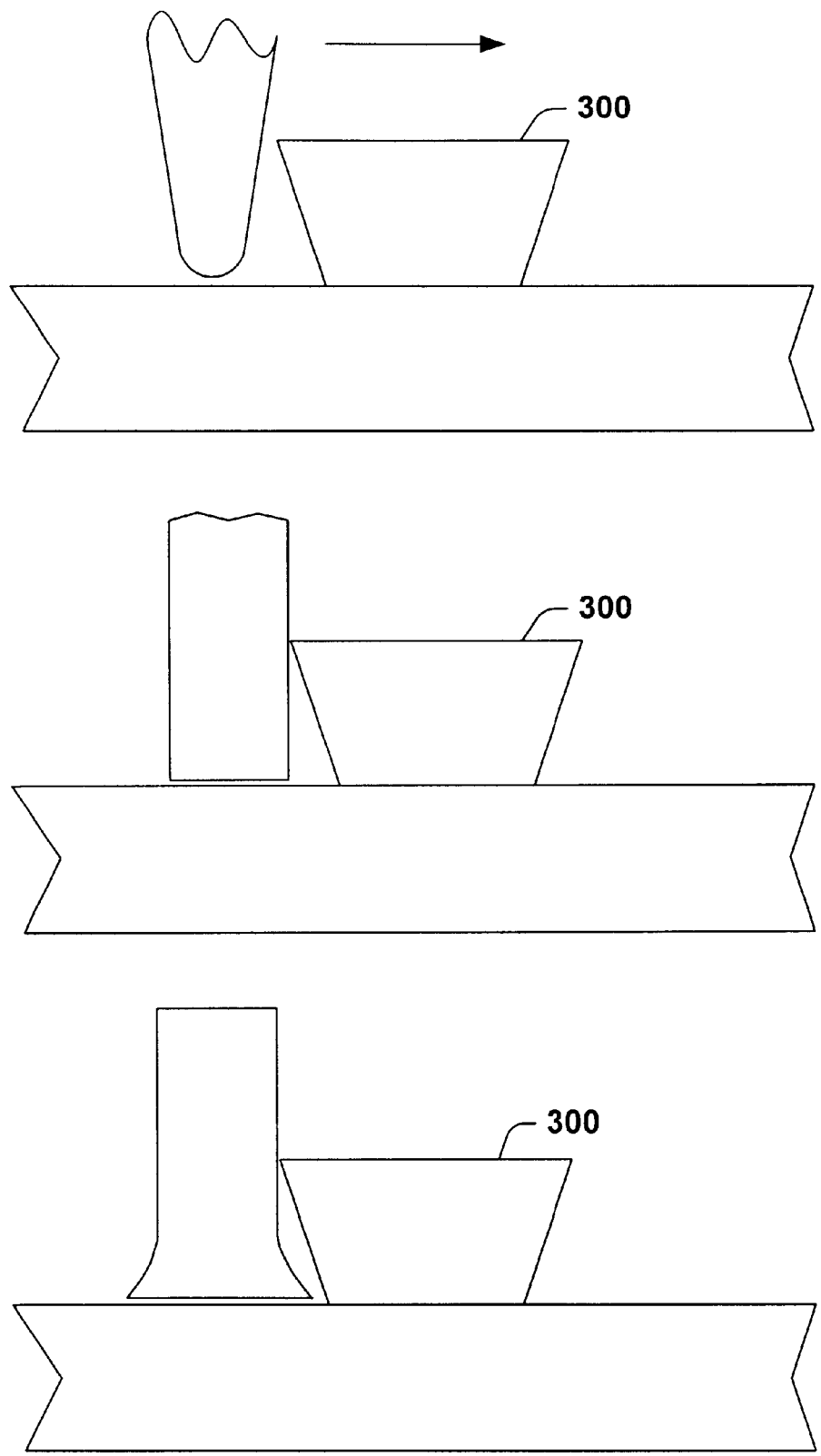
FIGS. 10a and 10b are cross section diagrams illustrating use of multiple different type scanning tips and their use in deconvolving tip effects for a re-entrant type feature according to the present invention.
Figure 10B:
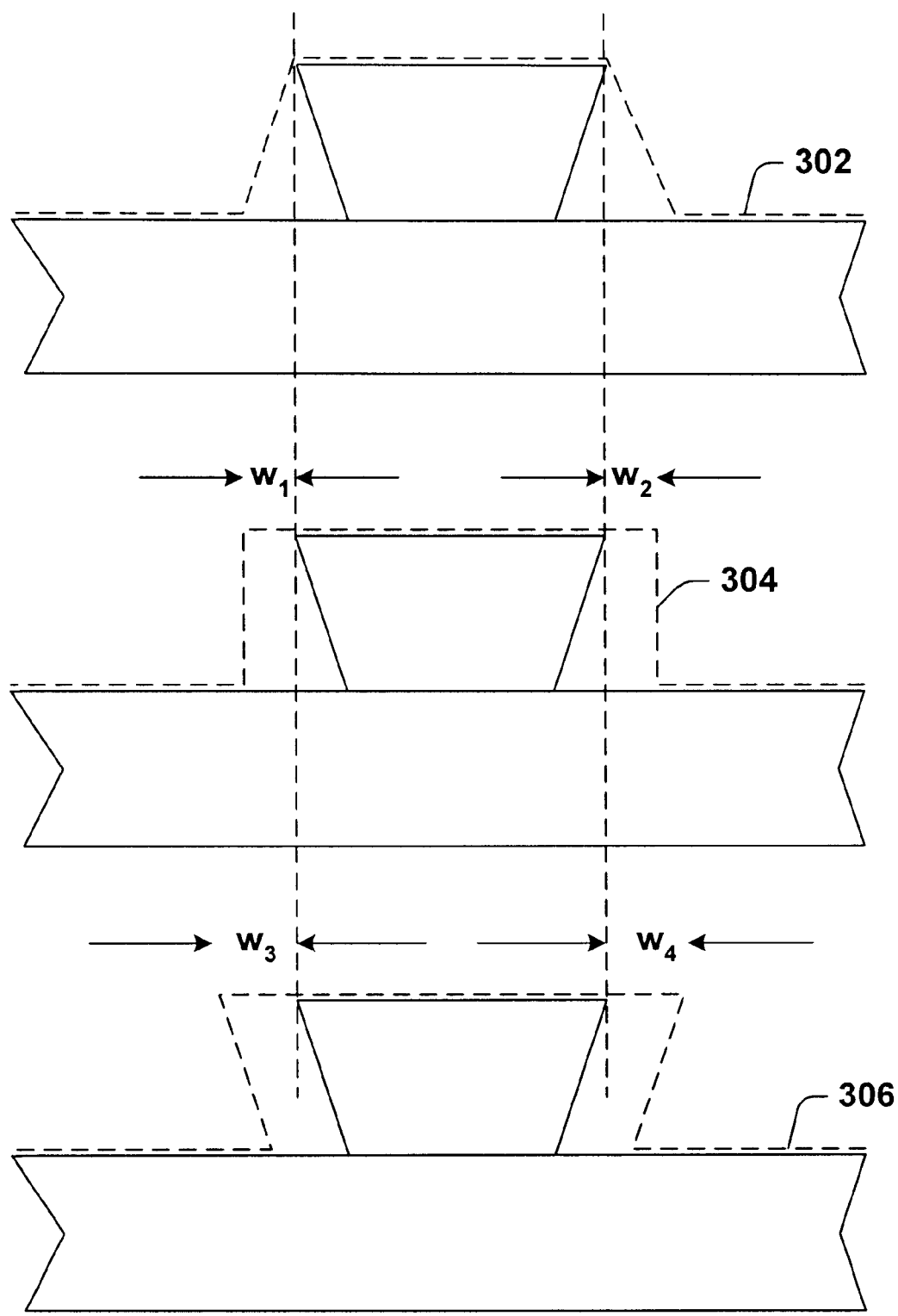

In FIG. 10a, the re-entrant profile 300 is scanned using three different types of scanning tips, resulting in three different sets of scan data, as illustrated in FIG. 10b and designated at reference numerals 302, 304 and 306, respectively. Using the data, the processor 120 may determine the widths of the cylindrical tip and the boot tip as $w_1+w_2$ and $w_3+w_4$, respectively. In addition, in a manner similar to that described supra, the conical tip characteristics may be determined. Furthermore, using the three types of tips as highlighted above gives the system 100 flexibility in that numerous different types of features may be analyzed.

According to another aspect of the present invention, a method of deconvolving tip effects is disclosed. While, for purposes of simplicity of explanation, the methodology disclosed below is shown and described as a series of steps, it is to be understood and appreciated that the present invention is not limited to the order of steps, as some steps may, in accordance with the present invention, occur in different orders and/or concurrently with other steps from that shown and described herein. Moreover, not all illustrated steps may be required to implement a methodology in accordance with an aspect of the present invention.

In FIG. 11, a flow chart is provided illustrating a method 400 for deconvolving tip effects of scanning tips in scanning probe microscopes. The method 400 begins at step 402, wherein a feature is scanned with a first type scanning tip. For example, the feature may be a line such as the feature 110 of FIG. 3, however, any type feature or artifact may be scanned and any such alternative is contemplated as falling within the scope of the present invention. In addition, according to one exemplary aspect of the present invention, the scanning of the first type scanning tip is carried out using an SPM, however, any mechanism for effectuating a scanning of the feature may be employed and such mechanism, machines, systems, etc. are contemplated as falling within the scope of the present invention. Furthermore, in the present example, the first type of scanning tip is a conical type scanning tip, however, any type of scanning tip may be utilized in step 402.

The method 400 then continues at step 404, wherein the feature is scanned again with a second type of scanning tip which differs from the first type of scanning tip employed in step 402. For example, if the first type tip is a conical scanning tip, the second type tip may be a cylindrical scanning tip or a boot type scanning tip. In accordance with one exemplary aspect of the present invention, the scanning step 404 is of the same feature as that scanned in step 402 and occurs at the same location on the feature or at a location in which the transverse profile of the feature will be approximately the same. Alternatively, however, if calibration features of similar or identical dimensions are utilized in conjunction with the method 400, different features may be used in steps 402 and 404.

Once the multiple data sets are collected at steps 402 and 404, the tip effects are deconvolved from the scan data at step 406 using the scan data from the multiple, different tips. For example, such deconvolution may be effectuated using the data processing techniques discussed in conjunction with FIG. 6 and FIGS. 7a–7b, however, any data processing using the multiple data scan sets may be employed and are contemplated as falling within the scope of the present invention.

In accordance with another aspect of the present invention, a method of determining tip dimensions without directly measuring the scanning tips is illustrated in FIG. 12 and designated at reference numeral 420. Initially, a feature such as the feature 110 of FIG. 3 is scanned with a conical tip at step 422, thereby generating scan data similar to that shown in FIG. 4e. Of course, the actual scan data will be a function of the type of feature being scanned. At step 424, the feature is again scanned with another type of scanning tip, such as a cylindrical type tip or a boot type tip, thereby generating scan data similar to that illustrated in FIG. 5e.

The method 420 then continues at step 426 by extracting a portion of the feature dimension from the conical tip scan data. For example, a processor such as the processor 120 of FIG. 3 may analyze the scan data of FIG. 4e and determine a width of the top portion 168 of the feature by various forms of signal processing techniques. For example, the processor may analyze the slopes of groups of pixels and collects groups having negligible slopes associated therewith to identify relatively flat portions of the feature or may identify the data corners via data processing techniques and calculate the distance therebetween. Any processing technique employed on the conical tip scan data to determine the feature width may be employed and is contemplated as falling within the scope of the present invention.

Using the extracted feature dimension of step 426, a width characteristic of the second type scanning tip (e.g., the cylindrical tip or the boot type tip) is determined at step 428. For example, step 428 may be performed using a processor such as the processor 120 of FIG. 3 which is adapted to manipulate and/or process the various sets of scan data in a manner similar to that shown and described above in conjunction with FIG. 6. Alternatively, other analysis methods may be employed and are contemplated as falling within the scope of the present invention. Subsequently, the method 420 concludes with step 430, wherein the characteristics of the conical scanning tip are determined using the scan data, for example, in a manner similar to that illustrated and described above in conjunction with FIGS. 7a and 7b.

Lastly, the methods such as the methods 400 and 420 described above may be implemented in conjunction with a scanning system such as the SPM system 100 of FIG. 3 to generate offset correction factors "on the fly" and display scan data associated therewith that accurately reflect the feature or features being scanned. Such on the fly correction is advantageous in that the tip effects on scan data are typically not static, but instead vary due to wearing of the tips, etc. Consequently, the method of the present invention provides a dynamic deconvolution of tip effects with corresponding correction to generate and display accurate feature dimensions independent of changes in tip characteristics over time.

Figure 13:
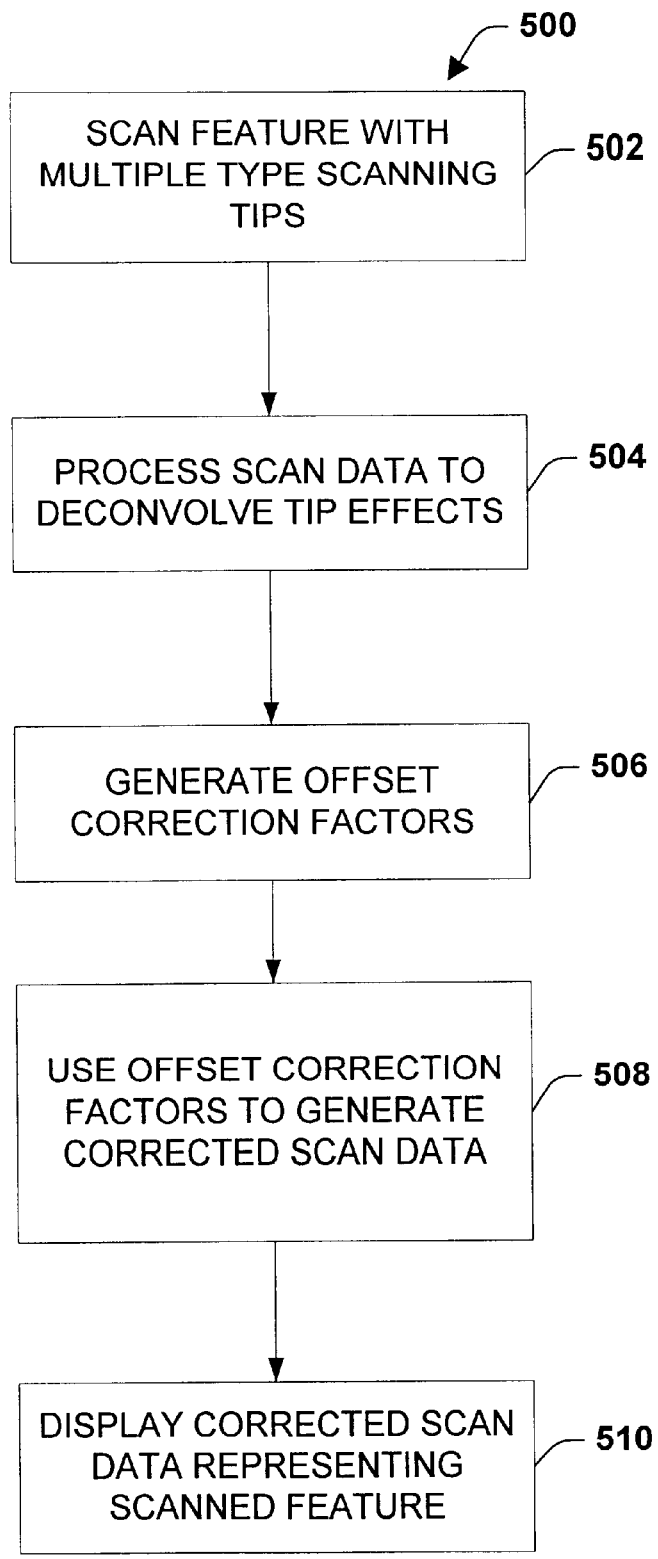
FIG. 13 is a flow chart illustrating a method of displaying corrected scan data corresponding to a scanned feature by scanning the feature using multiple, different type scanning tips according to the present invention.

A method in accordance with the above described advantages is illustrated in FIG. 13 and designated at reference numeral 500. The method 500 scans a feature with multiple scanning tips in accordance with the various examples described above to generate multiple sets of scan data of the feature which correspond to the different tips at step 502. The sets of scan data are then processed to deconvolve the tip effects at step 504, for example, in the manner described in the system and method highlighted above. Since the scan data associated with the feature under present examination is used to deconvolve the tip effects, any wear on the tips or other tip characteristic changes will be reflected in the sets of scan data and therefore will be deconvolved, thereby resulting in a dynamic process having improved feature dimension accuracy.

The offset factors associated with the deconvolved tip effects are then generated at step 506 and used to correct the scan data provided by the tips at step 508. Since multiple sets of scan data exists for the feature of interest, step 508 may select one set of corrected scan data or average the various sets together to generate the final corrected scan data, as may be desired. The corrected scan data is then displayed at step 510, either with a visual representation with numerical data on a computer screen, or on paper via a printer, or via any other form of output peripheral device, and any such output is contemplated as falling within the scope of the present invention.

Although the invention has been shown and described with respect to a certain preferred embodiment or embodiments, it is obvious that equivalent alterations and modifications will occur to others skilled in the art upon reading and understanding this specification and the annexed drawings. In particular regard to the various functions performed by the above described components (systems, devices, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Furthermore, to the extent that the term "includes" is used in either the detailed description or the claims, such term is intended to be inclusive in a manner similar to the term "comprising."

What is claimed is:

1. A system for deconvolving tip effects associated with scanning tips in scanning probe microscopes and other scanning systems, comprising:
    a scanning system operable to scan a feature or artifact with multiple, different type scanning tips and generate scan data associated therewith; and
    a processor operably coupled to the scanning system, the processor adapted to determine characteristics associated with the multiple, different type scanning tips using the scan data associated therewith.

2. The system of claim 1, wherein the scanning system comprises a controller operable to control a position of one or more cantilever arms having a scanning tip associated therewith with respect to a sample to be scanned, and detect a deflection of the one or more cantilever arms during a scan of the feature or artifact.

3. The system of claim 2, wherein the scanning system further comprises an output peripheral associated with the controller and operable to provide output information relating to the characteristics of the different type scanning tips or the feature or artifact being scanned.

4. The system of claim 2, wherein the scanning system further comprises a detection system associated with the controller, and operable to detect the deflection of the one or more cantilever arms and convey deflection information associated therewith to the controller.

5. The system of claim 4, wherein the detection system comprises an optical system in which a path length of light varies with respect to the deflection of the one or more cantilever arms, and wherein the optical system is operable to detect and convert the path length variations to deflection data.

6. The system of claim 4, wherein the detection system comprises a piezoelectric system operable to generate an electrical signal which is a function of a deformation due to deflection of the one or more cantilever arms.

7. The system of claim 1, wherein the scanning system further comprises a cantilever assembly having multiple cantilever arms, wherein each cantilever arm has a different type scanning tip associated therewith.

8. The system of claim 7, wherein the cantilever assembly is operable to scan the feature or artifact with the multiple cantilever arms and scanning tips in a serial fashion.

9. The system of claim 7, wherein the cantilever assembly is operable to scan the feature or artifact with multiple cantilever arms and scanning tips in a generally parallel fashion.

10. The system of claim 1, wherein one scanning tip comprises a conical type tip and another scanning tip comprises a cylindrical type scanning tip or a boot type scanning tip, and the processor is adapted to determine a feature dimension from a portion of scan data associated with the conical type scanning tip and use the feature dimension and the scan data associated with the cylindrical scanning tip or the boot type scanning tip to determine a width of the cylindrical scanning tip or the boot scanning tip, respectively.

11. The system of claim 10, wherein the processor is further adapted to generate one or more offset correction factors associated with the determined width for use in ascertaining a dimension of the feature or artifact.

12. A scanning probe microscope system, comprising:
    a scanning system comprising:
        a cantilever assembly comprising a plurality of cantilever arms having different type scanning tips associated therewith;
        a detection system operable to detect a deflection associated with the cantilever arms; and
        a controller operable to control a scanning position of the cantilever assembly and generate a plurality of scan data sets associated with the different type scanning tips in response to deflection data from the detection system; and
    a processor operably coupled to the scanning system and adapted to determine characteristics associated with the different type scanning tips using the scan data sets associated therewith.

13. The system of claim 12, wherein one of the plurality of scanning tips comprises a conical type tip and another of the plurality of scanning tips comprises a cylindrical type scanning tip or a boot type scanning tip, and the processor is adapted to determine a feature dimension from a portion of scan data associated with the conical type scanning tip and use the feature dimension and the scan data associated with the cylindrical scanning tip or the boot type scanning tip to determine a width of the cylindrical scanning tip or the boot scanning tip, respectively.

14. The system of claim 13, wherein the processor is further adapted to generate one or more offset correction factors associated with the determined width for use in ascertaining a dimension of the feature or artifact.

15. A method of determining scanning probe microscope tip effects, comprising the steps of:
    scanning a feature or artifact with a plurality of different type scanning tips, resulting in a plurality of scan data sets associated with the different type scanning tips; and
    deconvolving tip effects associated with the different type scanning tips using the plurality of scan data sets.

16. The method of claim 15, wherein scanning the feature or artifact with the plurality of different type scanning tips comprises scanning the feature or artifact one scanning tip at a time in a generally serial fashion.

17. The method of claim 15, wherein scanning the feature or artifact with the plurality of different type scanning tips comprises scanning the feature or artifact with the plurality of scanning tips at approximately the same time in a generally parallel fashion.

18. The method of claim 15, wherein one of the plurality of different type scanning tips comprises a conical type scanning tip and another of the plurality of different type scanning tips comprises a cylindrical type scanning tip or a boot type scanning tip.

19. The method of claim 18, wherein deconvolving the tip effects comprises:

determining a feature dimension from a portion of scan data associated with the conical type scanning tip; and using the feature dimension and the scan data associated with the cylindrical scanning tip or the boot type scanning tip to determine a width of the cylindrical scanning tip or the boot scanning tip, respectively.

20. The method of claim 19, further comprising the step of generating one or more offset correction factors associated with the determined width for use in ascertaining a dimension of the feature or artifact.

21. The method of claim 18, wherein deconvolving the tip effects comprises the steps of:

identifying a width dimension of the feature or artifact using the scan data associated with the conical type scanning tip; and determining a width of the cylindrical type scanning tip or the boot type scanning tip by subtracting the width dimension of the feature or artifact from a portion of the scan data associated with the cylindrical scanning tip or the boot type scanning tip, respectively.

22. The method of claim 21, wherein the portion of the scan data associated with the cylindrical scanning tip or the boot type scanning tip corresponds to a width of the feature convolved with a dimension of the cylindrical scanning tip or boot type tip, respectively.

23. A method of measuring a feature or artifact using a scanning probe microscope system, comprising the steps of:

scanning the feature or artifact using the scanning probe microscope having a plurality of different type scanning tips, thereby generating a plurality of scan data sets corresponding to the different type scanning tips, respectively;

processing the plurality of scan data sets to deconvolve tip effects associated with one or more of the plurality of different type scanning tips;

generating one or more offset correction factors using the deconvolved tip effects for the one or more of the plurality of different type scanning tips; and using at least one of the one or more offset correction factors to generate corrected scan data.

24. The method of claim 23, further comprising the step of displaying the corrected scan data to an output peripheral.

25. The method of claim 23, wherein one of the plurality of different type scanning tips comprises a conical type scanning tip and another of the plurality of different type scanning tips comprises a cylindrical type scanning tip or a boot type scanning tip.

26. The method of claim 25, wherein processing the plurality of scan data sets to deconvolve the tip effects comprises:

determining a feature dimension from a portion of scan data associated with the conical type scanning tip; and using the feature dimension and the scan data associated with the cylindrical scanning tip or the boot type scanning tip to determine a width of the cylindrical scanning tip or the boot scanning tip, respectively.

* * * * *